United States Patent [19]

Eriksson

[11] 3,795,332

[45] Mar. 5, 1974

[54] DEVICE FOR SETTING ASIDE OF AN IMPLEMENT CARRIED BY A VEHICLE AND FOR REPLACING THE IMPLEMENT ON THE VEHICLE

[75] Inventor: Lars Levi Eriksson, Svensbyn, Sweden

[73] Assignee: Bil-City i Pilea AB, Pitea, Sweden

[22] Filed: May 17, 1972

[21] Appl. No.: 254,174

[30] Foreign Application Priority Data
May 21, 1971 Sweden.............................. 6584/71

[52] U.S. Cl............................. 214/77 R, 214/131 A
[51] Int. Cl............................................... B66f 9/00
[58] Field of Search.... 214/75 H, 75 G, 138 C, 671, 214/621, 515, 77 R, 79, 80, 131 A

[56] References Cited
UNITED STATES PATENTS
3,570,692  3/1971  Andersen et al............ 214/131 A X
3,532,238  10/1970  McMillan....................... 214/671 X FOREIGN PATENTS OR APPLICATIONS
6,703,389  8/1968  Netherlands..................... 214/75 G
121,912  4/1971  Norway........................... 214/131 A
452,083  10/1948  Canada............................. 214/75 H
624,696  9/1961  Italy..................................... 214/80

Primary Examiner—Frank E. Werner
Attorney, Agent, or Firm—Fryer, Tjensvold, Phillips & Lempio

[57] ABSTRACT

A bearing plate is pivotally mounted for horizontal movement on the frame of a vehicle and normally mounts a support stand thereon. A work implement is pivotally mounted on the end of an articulated loader arm, swingably mounted on the support stand. Extension of a hydraulic cylinder will swing the bearing plate and support stand to a position alongside the vehicle. Outrigger legs, pivotally attached to the support stand, are extended to contact the ground along with the lowered work implement to form a tripod support therefor. Retraction of the bearing plate to its original position on the vehicle frame will disengage the support stand to permit the vehicle to be driven to a distant loading site.

10 Claims, 3 Drawing Figures

DEVICE FOR SETTING ASIDE OF AN IMPLEMENT CARRIED BY A VEHICLE AND FOR REPLACING THE IMPLEMENT ON THE VEHICLE

BACKGROUND OF THE INVENTION

The invention relates to a detachable mounting arrangement for selectively depositing a work implement, such as a self-loader, alongside a vehicle which normally mounts the work implement thereon.

It is common practice in the logging art, for example, to detachably mount a self-loader of the grappler type on the rear end of a self-propelling vehicle or on the front end of a trailer. Fastening devices employed for the former mountings normally require that the vehicle be driven off the road to deposit the self-loader thereat upon release of the fastening device. In the latter case, wherein the self-loader is mounted on the front end of a trailer having a drawbar, the employed fastening device must first be released and the work implement and extended outrigger must then be lowered to engage the ground to position the self-loader between the trailer and the towing vehicle. In order to clear the self-loader, the drive must jockey the vehicle to move the trailer backwards slightly to free the drawbar therefrom and then must move the trailer sideways to clear the self-loader.

Such maneuvers require considerable time, usually about one-half of an hour, and also requires the employment of an extra workman. Therefore, a workman will oftentimes refrain from setting aside the self-loader which gives rise to certain other disadvantages. For example, the undetached self-loader may weigh about 1,550 kg and occupies critical loading space (e.g., 3 sq. meters) on the vehicle which otherwise would contain logs or the like therein. Thus, typical loading-unloading cycles of operation, wherein the driving distance approximates 150 km, results in a capacity reduction of about 24 sq. meters per day and a monetary loss of 20 dollars per day to the owner. Furthermore, when the self-loader remains on the vehicle during a loading-unloading cycle, it is subjected to severe vibrational forces which tend to damage the working components thereof.

SUMMARY OF THE INVENTION

An object of this invention is to overcome the above, briefly described problems by providing a noncomplex and economical arrangement for detachably mounting a work implement on a vehicle and for selectively depositing the work implement alongside thereof. The mounting arrangement comprises a load bearing member pivotally mounted on a frame of the vehicle for horizontal swinging movement between a first position adajcent to the frame and a second or depositing position transverse thereof. A stand, having the work implement attached thereto, is normally releasably mounted on the bearing member.

DETAILED DESCRIPTION

Figure 1:
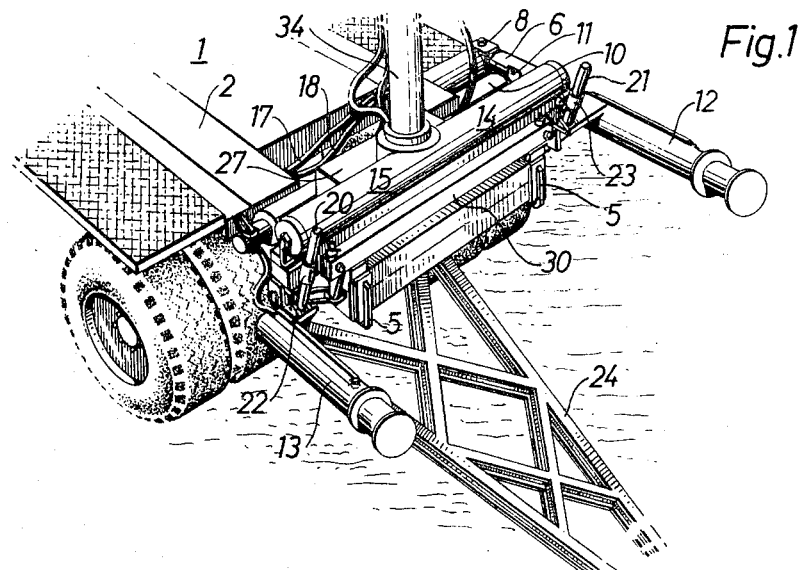
FIG. 1 is a partial perspective view of a vehicle having a hydraulically actuated self-loader detachably mounted thereon and maintained in its normal, loading position of operation.
Figure 2:
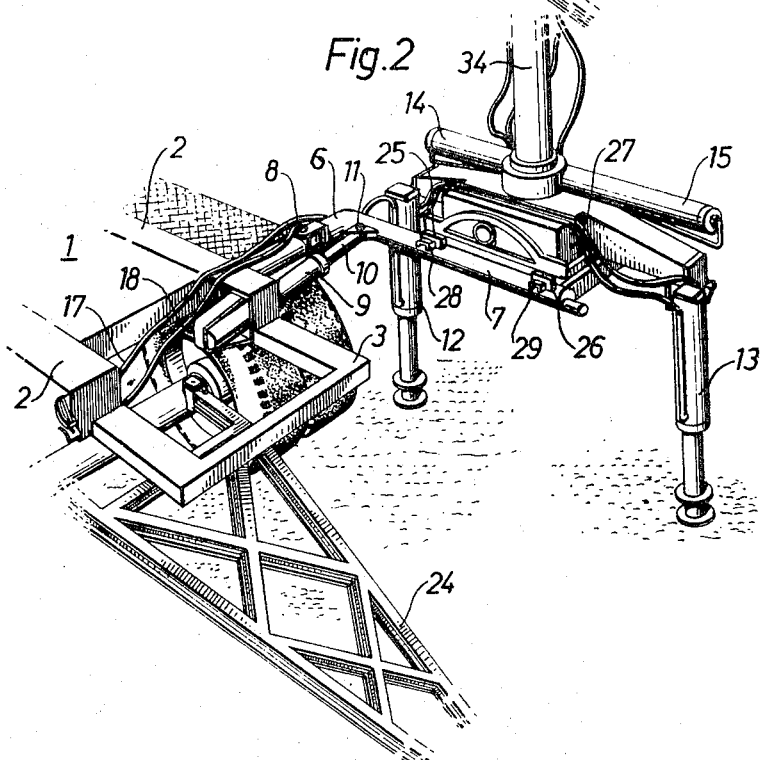
FIGS. 2 and 3 are similar views sequentially illustrating the self-loader in two different swing-out positions for depositing the self-loader alongside the vehicle.
Figure 3:
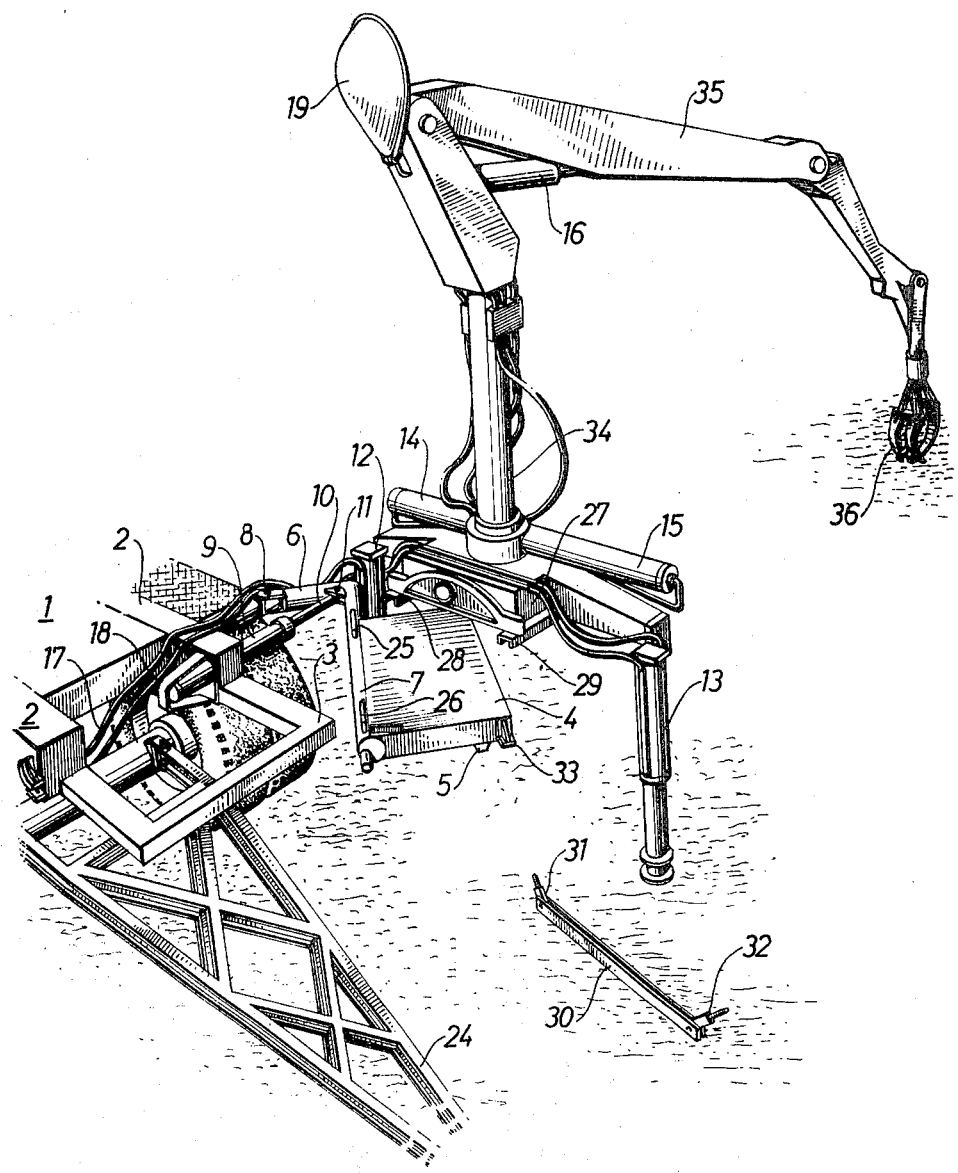

FIGS. 1-3 illustrate the front end of a trailer 1 disposed on a longitudinal axis thereof or, alternatively, the rear end of a self-propelled motor vehicle. The trailer comprises a chassis or frame 2 having a forwardly projecting and integral frame extension 3 projecting longitudinally beyond ground engaging wheels attached to the frame. The frame extension normally mounts a loader bearing member 4 of a detachable mounting arrangement of this invention thereon.

The load bearing member is releasably connected to an extension 3 of the chassis' frame by means of laterally spaced locking means 5 which are normally latched under the transverse end of the frame portion. The bearing member comprises a plate member and beam, comprising transverse first and second legs 6 and 7, respectively, which is pivotally mounted on one lateral side of chassis 2 by pivot means comprising a vertical pin 8.

Upon release of locking means 5, the bearing member and the work implement supported thereon may be pivoted outwardly from the first FIG. 1 position adjacent to the frame to the second FIG. 2 transverse position for depositing the work implement thereat. Horizontal movement of the bearing plate between such positions is effected by selectively extending actuating means, such as a double-acting hydraulic cylinder 9. The hydraulic cylinder comprises a rod 10 having its outer end pivotally mounted to leg portion 7 by a vertical pin 11.

The integrated fluid circuit further comprises double-acting hydraulic cylinders or outrigger legs 12 and 13, double-acting hydraulic cylinders 14 and 15, adapted to cooperate with a conventional rack and pinion drive mechanism (not shown) to selectively rotate the self-loader, and a double-acting hydraulic cylinder 16, adapted to selectively raise and lower an articulated loader arm 35 (FIG. 3). The cylinders are selectively extended or retracted via main supply conduits 17 and 18 by operator control means (not shown) mounted in the cab of the vehicle or adjacent to a swing-down operator's seat 19.

As shown in FIG. 1, horizontally disposed outrigger support legs 12 and 13 are provided with manually operated slide rods 20 and 21 which are loosely mounted for sliding movement in tubular holders 22 and 23, respectively, secured to a stand 27. The lower end of each slide rod is pivotally mounted on a respective outrigger leg and may be locked in its FIG. 1 position against axial movement by a releasable cotter pin or the like (not shown). Such locking arrangement permits the self-loader to be swung horizontally to its deposited position without having to disengage a drawbar 24, attached to the trailer at pivot points vertically below bearing member 4 for towing purposes. Upon release of the cotter pins, the outrigger legs may be pivoted downwardly to their vertical dispositions, shown in FIGS. 2 and 3.

As further shown in FIG. 2, the backside of self-loader stand 27 is releasably attached to bearing member 4 by laterally spaced locking means, comprising eyelets 25 and 26 secured to leg portion 7 and normally positioned to loosely receive the ends of lock bars 28 and 29, respectively, secured to stand 27. As shown in FIGS. 1 and 3, the front side of stand 27 is normally attached to lugs 33 of the bearing member by a releasable locking means or bar 30. The bar has locking bolts 31 and 32 pivotally mounted on the ends thereof for releasable disengagement from underlying lugs 33 by means of nuts (not shown) whereby stand 27 can be selectively released from the bearing member.

One advantage of having the self-loader arranged at the front of and outwardly from the trailer's chassis, or alternatively outwardly from the back of the towing vehicle, is that both the trailer and vehicle can then be served by the same self-loader which is mounted therebetween. Otherwise, one self-loader must be mounted directly on the rear of the trailer and a second self-loader must be mounted directly on the rear of the towing vehicle to accomplish the loading function.

Self-Loader Operation

It is first assumed that the trailer and attached towing truck have been preloaded with timber or the like by suitably operating the self-loader from its FIG. 1 position. During such loading, cylinders 14, 15 and 16 are selectively actuated to pick-up logs by means of grapple 36 to deposit them into the trailer and truck. The workman must now quickly detach the self-loader and deposit it at roadside whereby he can drive the truck-trailer to a timber storage site.

To commence such detachment, loader arm 35 is positioned to extend in general longitudinal alignment with the trailer. Upon release of locking means 5, the workman will extend cylinder 9 to load bearing member 4 and the attached self-loader laterally about pivot pin 8 from its FIG. 1 first position to its FIG. 2 second or depositing position. Outrigger legs 12 and 13 are then released and pivoted to their vertical positions by removing the above-described cotter pins (not shown) from slide rods 21 and 20. The slide rods may be relocked to stand 27, if so desired, and the hydraulically actuated outrigger legs are extended to engage the ground or other underlying surface (FIG. 2). If so desired, the slide rods and cooperating holders 22 and 23 could be replaced by small hydraulic cylinders (not shown) actuatable by the operator.

During the slewing-out of the self-loader to commence the self-loader depositing desiderata, the majority of its weight is substantially balanced by maintaining articulated loader arm 35 perpendicular to and on the trailer side of leg 7 of load bearing member 4. Thereafter, hydraulic cylinders 14 and 15 are actuated to selectively rotate upright 34 and loader arm 35 180° on stand 27 to its FIG. 3 position. Simultaneously therewith, log grapple 36 is moved into engagement with the ground, by extending cylinder 16, to form a tripod support along with support legs 12 and 13.

The self-loader is now placed alongside the trailer, locking bar 30 is removed (FIG. 3) and fluid conduits 8 and 9 are uncoupled from their standard connections on frame 2. Cylinder 9 is then retracted to reposition bearing member 4 on frame projection 3 for reattachment thereto by locking means 5. During such retractive movement of the bearing member, loosely coupled fastening means 25,28 and 26,29 are automatically released. As suggested above, locking bar 30 may either remain fixed to the stand or may be removed therefrom as shown in FIG. 3.

After the transported timber has been delivered to the storage site, the vehicle and attached trailer will return to the loading site whereat the above procedure is reversed to reattach the self-loader to the trailer, as shown in FIG. 1. The self-loader is now positioned to reload the vehicle and trailer to repeat the above described loading and unloading cycle of operation.

I claim:

1. A mounting arrangement normally mounting a work implement on a vehicle frame disposed on a longitudinal axis thereof, said work implement being operative to load said vehicle in this position, comprising a load bearing member movably mounted on said frame for horizontal movement between a first position adjacent to said frame to a second position transverse thereof and to said axis,
   a stand, having said work implement attached thereto, normally releasably mounted on said bearing member whereby said load bearing member can be moved to said second position to deposit said work implement in a storage position alongside and independent of said vehicle,
   pivot means pivotally mounting said bearing member on a lateral side of said frame,
   said bearing member comprising a beam attached to a plate member, said beam comprising a first leg pivotally mounted on said frame by said pivot means and a transversely disposed second leg secured directly to said plate member.

2. The invention of claim 1 further comprising actuating means operatively connected between said frame and said bearing member for selectively moving said bearing member and support work implement between said first and second positions.

3. The invention of claim 2 wherein said actuating means comprises a double-acting hydraulic cylinder.

4. The invention of claim 1 wherein said frame comprises an extension projecting longitudinally in the direction of said axis beyond ground engaging wheels attached to said frame and wherein said bearing member normally rests on said extension when it is in said first position.

5. The invention of claim 1 further comprising locking means for releasably attaching said bearing member to said frame.

6. The invention of claim 1 further comprising locking means for releasably attaching said stand to said bearing member.

7. The invention of claim 1 wherein said bearing member is movably mounted on the rear end of a self-propelling vehicle.

8. The invention of claim 1 wherein said bearing member is movably mounted on the front end of a trailer and further comprising a tow bar attached to the front end of said trailer, vertically below said bearing member.

9. The invention of claim 1 further comprising means pivotally mounting outrigger legs on said stand for permitting pivoting of each of said outrigger legs from a folded, horizontal position to a vertical position for engaging ground level to support said stand.

10. The invention of claim 9 wherein each of said outrigger legs comprises a double-acting hydraulic cylinder.

* * * * *